United States Patent [19]
Suzuki

[11] Patent Number: 4,508,000
[45] Date of Patent: Apr. 2, 1985

[54] FREQUENCY-SELECTABLE SIGNAL GENERATOR

[75] Inventor: Fuminori Suzuki, Tokorozawa, Japan

[73] Assignee: Citizen Watch Co., Ltd., Tokyo, Japan

[21] Appl. No.: 487,422

[22] Filed: Apr. 21, 1983

[30] Foreign Application Priority Data

Apr. 23, 1982 [JP] Japan .................................. 57-68447
May 28, 1982 [JP] Japan .................................. 57-89737

[51] Int. Cl.³ .............................................. G10H 5/06
[52] U.S. Cl. ............................... 84/1.01; 84/DIG. 11; 84/DIG. 23
[58] Field of Search ....... 84/1.01, DIG. 11, DIG. 23; 328/14–18; 331/78

[56] References Cited

U.S. PATENT DOCUMENTS 4,296,384  10/1981  Mishima ................................. 331/78
4,333,374   6/1982  Okumura et al. ..................... 84/1.01
4,434,696   3/1984  Conviser ............................... 84/1.01

Primary Examiner—S. J. Witkowski
Attorney, Agent, or Firm—Birch, Stewart, Kolasch & Birch

[57] ABSTRACT

Disclosed is a frequency-selectable signal generator in which a numeric datum is parallel-transferred to a full adder circuit repeatedly under the control of clock pulse signals, thereby outputting an overflow signal, which is a precise division of accumulation of repeatedly inputting numbers. The frequency of the overflow signal varies with the number represented by the numeric datum. The output signal has a regular pulse-to-pulse interval, and therefore it can be used in producing a musical note.

4 Claims, 9 Drawing Figures

PRIOR ART
FIG. 3
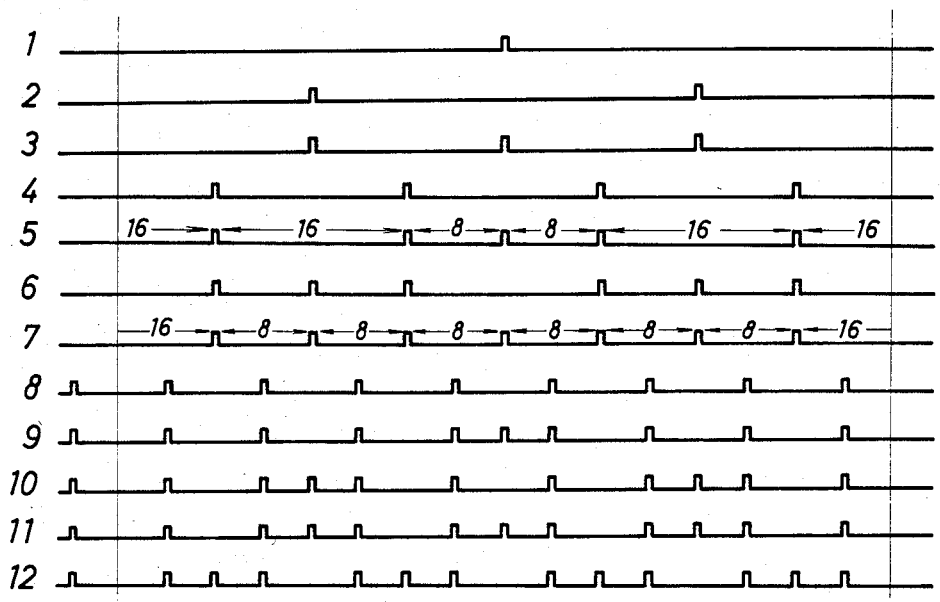
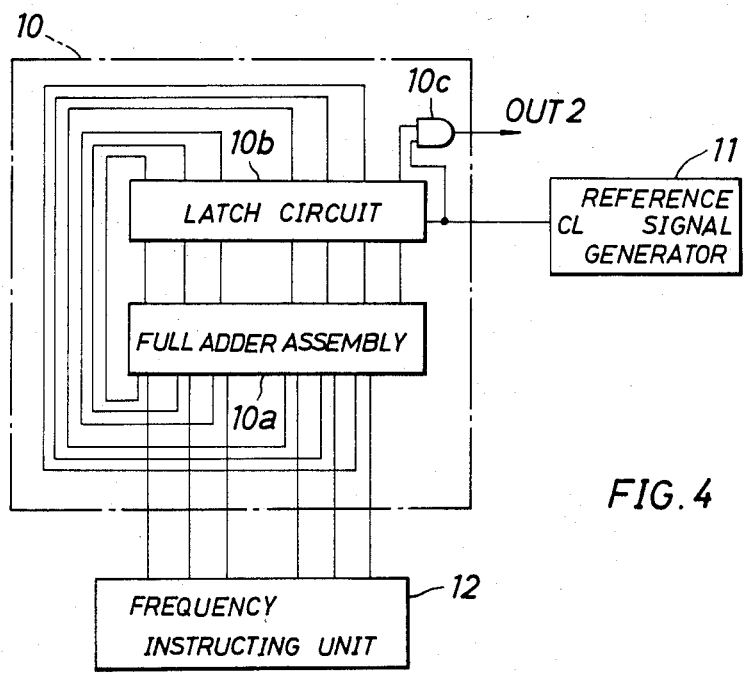
FIG. 4

FIG. 8
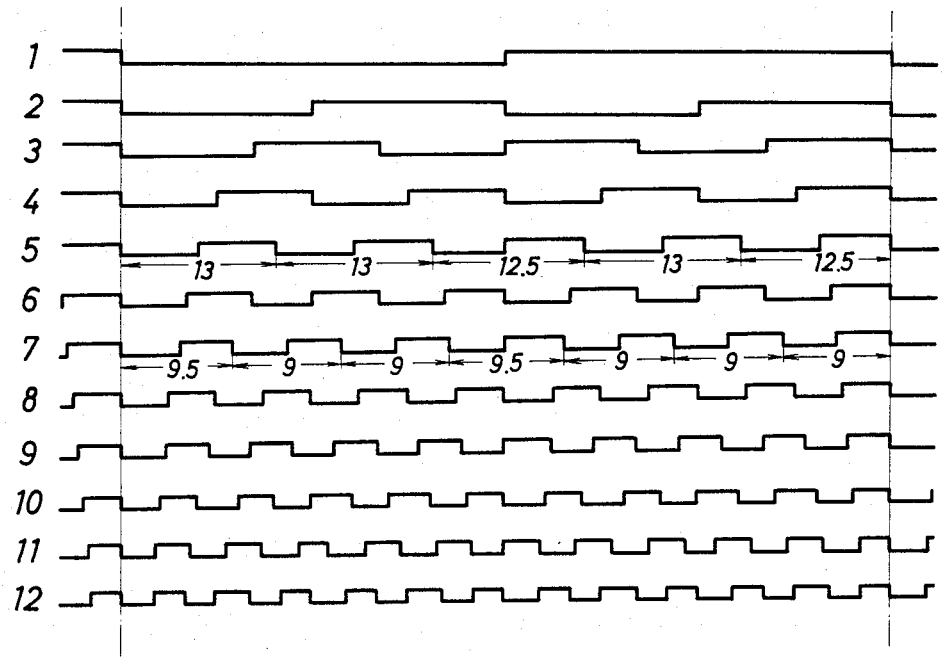
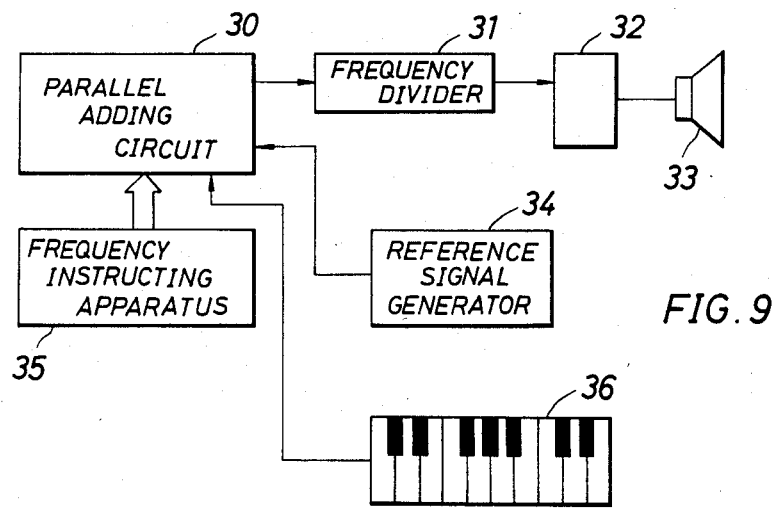
FIG. 9

FREQUENCY-SELECTABLE SIGNAL GENERATOR

BACKGROUND OF THE INVENTION

Field of the Invention

This invention relates to a signal generator which is capable of providing a frequency signal as requested by digitally processing a given reference signal from a reference signal generator such as a crystal-controlled oscillator.

There has been hitherto known a signal generator which is capable of providing as low a frequency as requested by digitally processing a clock signal from a clock signal generator such as a crystal controlled oscillator, and such frequency-selectable signal generator have been widely used in different fields of art. On typical example of the use of such frequency-selectable signal generator is found in an electronic musical instrument. A conventional electronic instrument uses a "period counting system" in which each of different-notes of the musical scale is produced by counting and picking up clock pulses at a predetermined interval corresponding to the frequency of the note. The accuracy with which the "period counting system" can produce notes depends on the resolving power of the clock signal, and therefore a clock signal of as high a frequency as 4 MHz is used in the hope of producing fairly accurate musical notes. Recently, a small-sized electronic device such as an electronic watch, having a musical function has been available in the market. As is well known, such a small-sized electronic device uses a minute button type cell as a power supply, and therefore, a 4 MHz oscillator cannot be used as a clock signal generator because of the shortening of the life of the cell which would be caused by the use of the 4 MHz oscillator. In this connection and in view of cost and space saving a crystal-controlled oscillator of 32,768 Hz is commonly used as a reference signal generator and, at the same time, in an electronic watch as a clock signal generator for providing notes of the musical scale. Then, the melody-producing electronic watch uses a "period counting system" which is designed to work with clock signal of as low a frequency as 32,768 Hz. The use of such low frequency clock signal inevitably deteriorates the quality of melody because of inaccuracy in resultant notes of the musical scale, as for instance 885.6 Hz or 862.3 Hz are obtained for Note "A" or 880 Hz as a division of 32,768 Hz by 37 or 38 respectively. In an attempt to reduce such offset from the exact notes, a frequency multiplying circuit is used at the cost of increase of consumption of electric power and complicated structure of electrical circuits. Thus, the reference frequency is increased to 65,536 Hz, and then the high frequency is divided to obtain notes of musical scale as requested. The result is halving of the error which otherwise, would appear in resultant notes of the musical scale.

In contrast to this, there has been proposed a system for digitally processing clock signals with a higher accuracy than the "period counting system". For example, in reducing 32,768 Hz to 10 Hz, which low frequency is inevitably used in a stopwatch mode, 32,768 Hz is divided by the "n"th of 2, and 128 Hz thus obtained is divided alternately by 12 and by 13. This proposed system has satisfactorily met the demand for reducing a high frequency to a single low frequency. It, however, cannot meet the demand for reducing a high frequency to a plurality of different frequencies corresponding to the particular notes of the musical scale for the following reasons: Two different ratios of division are set for each note of the musical scale, and these different ratios are selectively used to produce a particular note. This necessitates a control circuit appropriate for the purpose. The control circuit, however, is inhibitably complicated in structure, and indeed, an electronic watch cannot be equipped with such control circuit.

Also, there has been proposed a system commonly called "Rate-multiplier", which is capable of providing directly a frequency signal as requested. This proposed system, however, has a disadvantage of producing note signals in the form of pulses at irregular intervals. Therefore, a melody cannot be made with recourse to the rate-multiplier. This is described in detail with reference to FIGS. 1-3 as follows:

FIG. 1 shows a conventional rate-multiplier as including a frequency divider 1 for dividing a clock signal "CL". The frequency divider 1 is composed of a series-arrangement of six flip-flops "1a" to "1f", each producing an output signal at its terminal "Q". These output signals are directed to as many AND gates "3a" to "3f" directly or via associated inverters "2a" to "2f". Each AND gate is supplied with an inverted output signal from an associated flip-flop and output signals at higher frequencies from the antescedent flip-flops, producing an output of logical multiplication of these input signals. For instance, an output signal from the final stage "1a" is inverted by an inverter "2a", and then directed to the AND gate "3a" whereas the output signals from the other stages "1b" to "1f" are directed to the AND gate "3a" without being inverted. The output signals S0–S5 from the AND gates "3a" to "3f" are directed to an OR gate, and an output signal appears at the terminal OUT 1 of the rate-multiplier. As seen from FIG. 1, control signals in the form of binary-coded parallel data corresponding to a musical note as demanded are supplied over conductors "D0" to "D5" to put the AND gates selectively open, thereby causing the rate-multiplier to generate the output signal at the same frequency as the musical note as its output terminal OUT 1.

FIG. 2 shows waveforms of different output signals S0–S5 appearing at the output terminal of the AND gates "3a" to "3f". In a 6-bit type rate-multiplier as shown in FIG. 1, six different trains of pulses, not occurring concurrently, appear, and 64 different output signals can be obtained by combining those six elemental trains of pulses.

FIG. 3 shows 12 different waveforms of signals appearing at the output terminal OUT 1 of the rate-multiplier within one cycle which is a period equivalent to 64 clock pulses. Sixty-four waveforms 0 to 63 can be produced with binary-coded parallel numeric data. As is apparent from the graphic representation, pulses appear at regular intervals for parallel numeric data representing numbers 2,4,8, . . . ($2^n$ in general) whereas pulses appear at irregular intervals for the remainder parallel data, as for instance "16-16-16-8-8" for parallel datum representing number 5 and "16-8-8-8-8-8" for parallel datum representing number 7. These repetitive patterns, however undesirably large in pulse-to-pulse irregularity, compared with those which could be obtained in a digital processing system ("13-13-13-13-12" for parallel datum representing a decimal number 5 and "10-9-9-9-9-9" for parallel datum representing number 7). As for parallel datum representing a decimal number 5, two different intervals appear two or more times in succession within one cyclic period as is "16-16-16-8-8". For this reason, the sound thus produced is unpleasing to ear, and in fact, cannot be used to make a musical melody.

SUMMARY OF THE INVENTION

In view of the above one object of this invention is to provide a signal generator which is guaranteed free of the drawbacks of those conventional systems as mentioned above, still having the advantage of frequency setting with such ease as in the rate-multiplier and of reducing the irregularity in pulse-to-pulse intervals.

Another object of this invention is to provide a frequency-selectable signal generator which is capable of producing a frequency signal as requested from the clock signal of a relatively low frequency with accuracy.

Other objects and advantages of this invention will be better understood from the following description of preferred embodiments which are shown in accompanying drawings.

BRIEF DESCRIPTION OF THE DRAWINGS

FIG. 3 shows a graphic representation of waveforms at the output terminal of the rate-multiplier of FIG. 1;

FIG. 4 shows a frequency-selectable signal generator according to one embodiment of this invention;

FIG. 8 shows waveforms appearing at the output terminal of the frequency-selectable generator of FIG. 6; and FIG. 9 us a block diagram showing a musical note generating circuit which uses a frequency-selectable signal generator according to this invention.

DETAILED DESCRIPTION OF THE PREFERRED EMBODIMENTS

Figure 1:
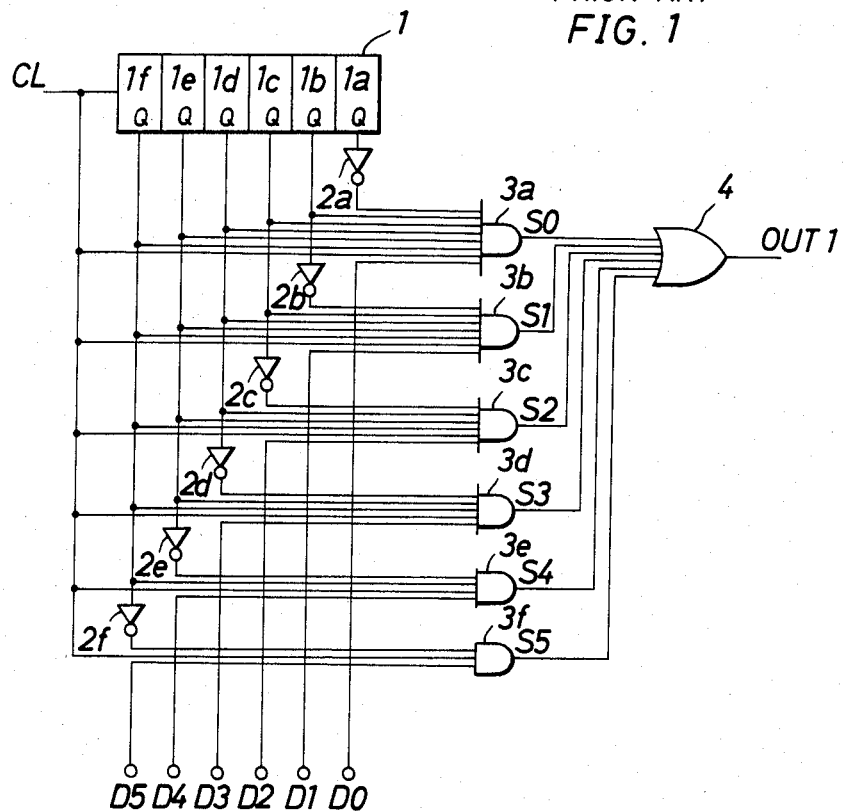
FIG. 1 shows a conventional rate-multiplier used for providing a frequency signal as requested.
Figure 2:
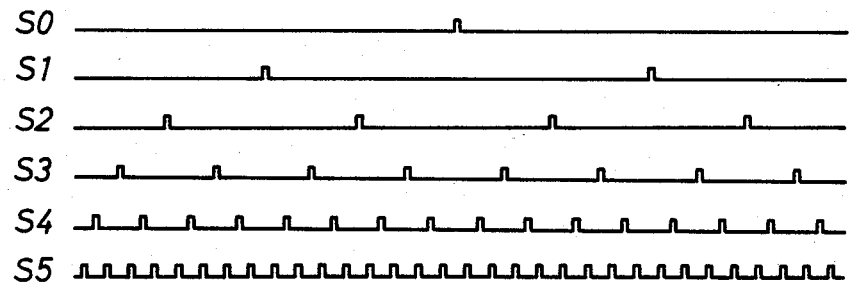
FIG. 2 shows a graphic representation of waveforms appearing at the output terminals of AND gates in the rate-multiplier of FIG. 1.

Referring to FIG. 4, there is shown a frequency-selectable signal generator according to a first embodiment of this invention. As shown, it comprises a parallel adder circuit 10, a reference signal generator 11 for supplying a train of clock pulses to the parallel adder circuit 10 and a frequency instructing unit 12 for supplying a binary coded parallel numeric data one after another to the parallel adder circuit 10. The parallel adder circuit 10 includes a full adder assembly 10a and an associated register or latch circuit 10 both working together in unison under the control of the clock signal from the reference signal generator 11 to carry out the summation of parallel data. More specifically, the full adder assembly 10a is composed of six full adders, adding 6-bit parallel data bit by bit, and producing a 7-bit summation result, whereas the latch circuit 10b registers the 7-bit summation result, and then it feeds the six least significant bits back to the input terminals of the full adder assembly 10a, and at the same time, supplies to most significant bit to an AND gate 10c, which allows this overflow signal to pass therethrough synchronous with the clock signal from the clock signal generator 11. The whole operation is conducted under the control of clock pulses from the reference signal generator 11. The frequency instructing unit 12 may be a keyboard or melody storing device for supplying binary-coded parallel numeric data each representing a melody note corresponding to one of 12 divisions of a given octave.

The parallel adder circuit 10 may be understood as an accumulation type parallel adder, which is capable of adding repeatedly the same parallel datum fed from the frequency instructing unit 12 to a precedent summation result under the control of clock pulses from the reference signal generator 11. Each addition is carried out each clock pulse, and therefore the rate of reduction or division "D" in the parallel adder circuit 10 is given by:

$$D = S \cdot (\tfrac{1}{2})^p$$

where "p" stands for the number of bits constituting a binary-coded parallel numeric datum and "S" stands for a binary number.

The frequency "f" of the overflow signal from the parallel adder circuit 10 is given by:

$$f_1 = f_o \cdot S \cdot (\tfrac{1}{2})^p$$

where "f" stands for the frequency of the clock signal from the reference signal generator 11.

Figure 5:
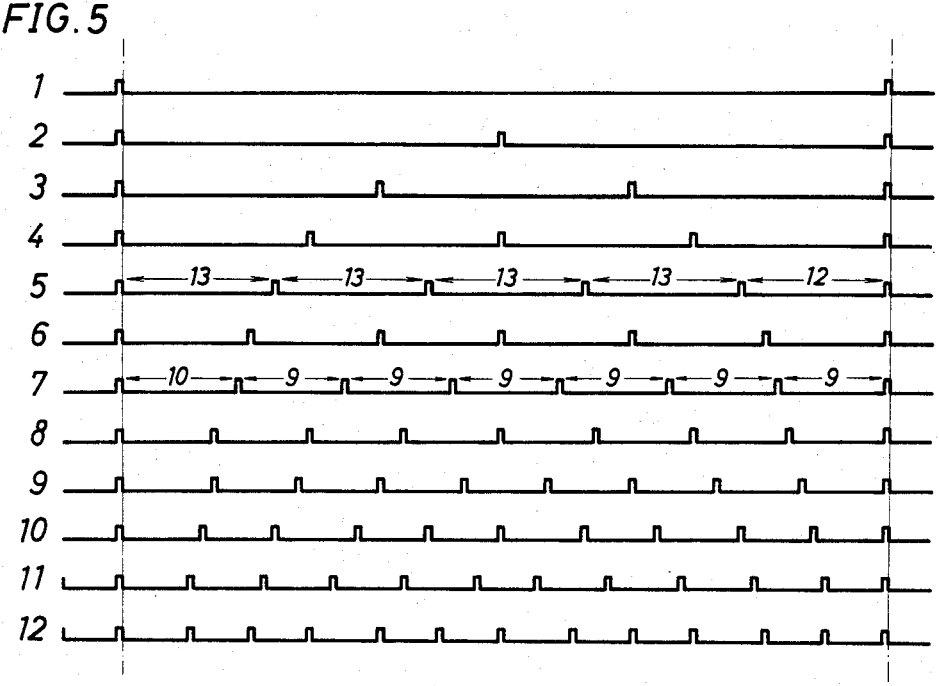
FIG. 5 shows a graphic representation of waveforms appearing at the output terminal of the frequency-selectable signal generator of FIG. 4.

FIG. 5 shows different waveforms of the output signals appearing at the terminal OUT 2 of the frequency-selectable signal generator of FIG. 4 for different parallel data input signals. This graphic representation has the same configuration as FIG. 3 for allowing direct comparison in terms of regularity of pulse-to-pulse intervals. As seen from FIG. 5, for one example, the pulse-to-pulse intervals for a parallel numeric datum representing a decimal number "5" are given "13-13-13-13-12" in terms of clock pulse, and for another example, those for a parallel datum representing a decimal number "7" are given "10-9-9-9-9-9-9". These interval sequences are fairly close to the ideal regular pattern. Taking an example of a parallel datum representing a decimal number "5", a detailed explanation is given as follows: the full adder assembly 10a is of a 6-bit structure, and therefore it is full to overflowing when the summation result reaches high to $2^6$, that is, 64. The first overflow occurs when "5" is added 13 times ($5 \times 13 = 65$), and then the remainder "1" ($65-64=1$) is left in the full adder assembly.

The next summation begins with addition of "5" to the remainder "1", and the second overflow occurs when "5" is added to 13 times, also. Then the remainder "2" is left in the full adder assembly 10a. After a similar calculating process, "4" remains in the full adder when the fourth overflow signal appears. The final calculation is conducted ($4+5 \times 12 = 64$), and the twelveth addition is finished when the fifth overflow signal appears. The regularity in pulse-to-pulse intervals can be improved by dividing the frequency of the output signal from the parallel adder circuit 10 with the aid of a conventional frequency divider. Irrespective of how many times the division is repeated, the difference between two kinds of pulse-to-pulse intervals remains equal to one clock pulse at all times. The pulse-to-pulse intervals, however, are extended at each time of division and accordingly the offset between two kinds of pulse-topulse intervals is reduced making pulse-to-pulse intervals closer and closer to a regular period. Taking an example of a parallel datum representing decimal number "5", the frequency of the output signal from the parallel adder circuit 10 is divided, for instance, by "2", and then the repetitive pattern is "26-26-25-26-25". The resultant signal is divided by "2" again, and then the repetitive pattern is "52-51-51-51-51". The third division by "2" changes the repetitive pattern to "103-102-103-102-102", which can be rewritten "12.875-12.75-12.875-12.75-12.75". The original repetitive pattern "13-13-13-13-12" is improved in regularity to this extent as a result of three times of division.

Figure 6:
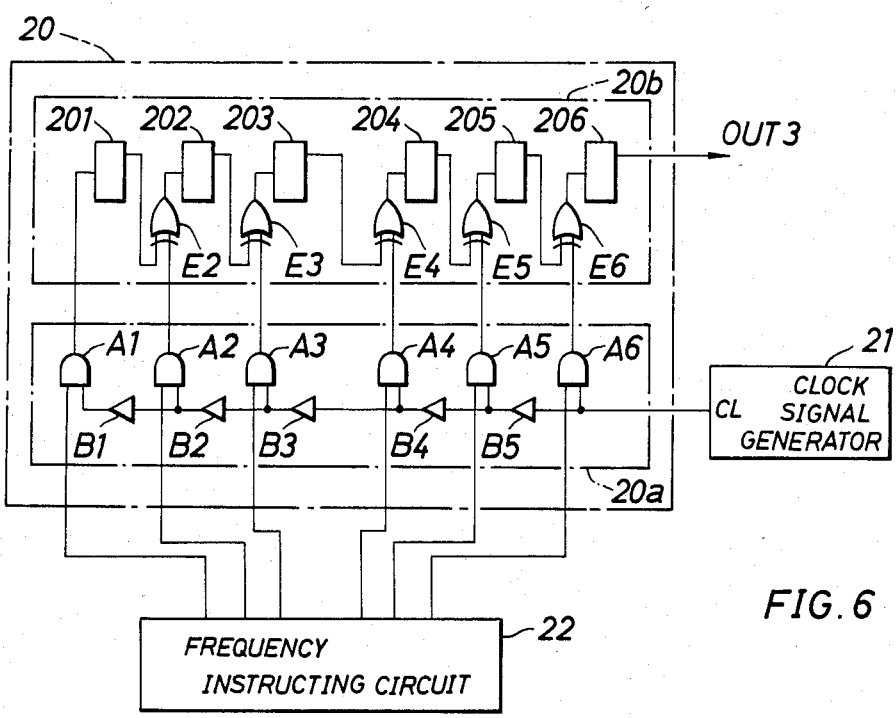
FIG. 6 shows a frequency-selectable signal generator according to another embodiment of this invention.

Referring to FIG. 6, there is shown a frequency-selectable signal generator according to a second embodiment of this invention. It comprises an adding counter 20b and an associated drive circuit 20a. The adding counter 20b comprises a plurality of toggle type flip-flops (abbreviated as "FF" hereinafter) 201–206 and a plurality of exclusive OR gates (abbreviated as "EX-OR" hereinafter) E2–E6, each connecting two adjacent FFs. The input conductor to the least significant FF 201 and the conductors each to one input terminal of each EX-OR constitute bus bars connecting the adding counter 20b to the drive circuit 20a. Input signals are directed over those bus bars to the FFs and a carry signal appears at the output terminal OUT 3 of the most significant FF 206.

The drive circuit 20a includes a plurality of AND gates A1–A6, one input terminal each of which gate is connected to a frequency instructing circuit 22 and the other input terminal of each gate is connected to a clock signal generator 21. If occasions demand for the resons described later, a plurality of delay circuits B1 to B5 may be provided each in between two adjacent AND gates, thereby causing the clock signal to delay increasingly from the AND gate A6 to the AND gate A1.

In operation, when a binary coded parallel datum is applied to the AND gates A1–A6, some of these gates are selected to allow the clock pulse to pass therethrough, thereby causing associated FFs to reverse, and the logic signal appearing at the output of each reversed FF is applied to its precedent FF through an associated EX-OR. The output signals from the EX-ORs E2–E6 are composed of the clock signal and the output signal from the less-significant FF, including a transient whisker pulse.

Figure 7:
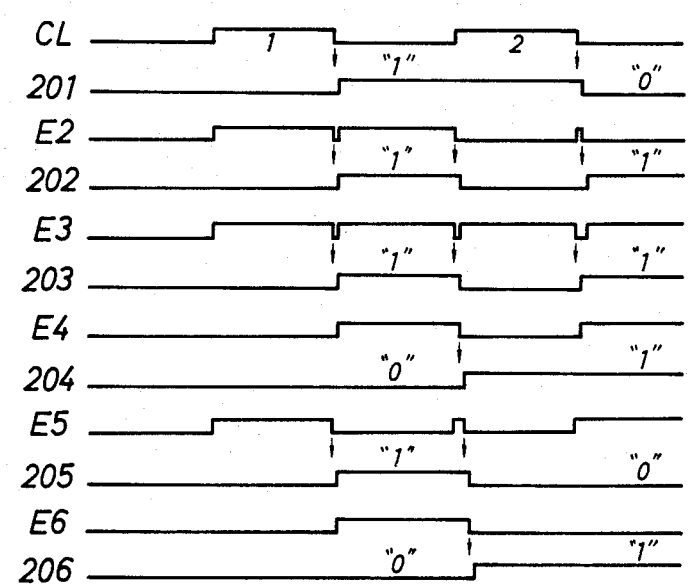
FIG. 7 shows waveforms appearing at different portions of the frequency-selectable generator of FIG. 6.

FIG. 7 shows waveforms of signals appearing at different portions of the parallel adder circuit 20 of FIG. 6. First, assume that the adding counter 20b is reset and that the frequency instructing circuit 22 supplies a binary-coded parallel numeric datum "010111", which is equivalent to a decimal "23". Before applying a clock signal "CL" to the parallel adder circuit 20, a logic "zero" signal appears at the output terminal each of the FFs 201 to 206, remaining at a low level. The clock signal passes through the AND gates A1, A2, A3 and A5, to which logic "one" signals are applied from the frequency instructing circuit 22. Thus, the FFs 201, 202, 203 and 205 are set simultaneous with the fall of the first clock pulse, bringing their outputs to a high level. Thus, the number "23" is stored. Application of another clock pulse causes addition of the number "23" to the stored one, thus making the total number equal to "46" in the adding counter 20b. Specifically, the FFs 202, 203, 204 and 206 produce output signals at a high level after the termination of the second clock pulse. Then, the output signals at the EX-OR E2 to E6 are of complicated configuration resulting from clock signals and carry signals from less-signficant FFs and including whisker pulses. These whisker pulses are indispensable for the proper operation of the parallel adder circuit, and it is necessary that they are assured to appear and that they should be effective enough to cause the following FF to reverse. In an attempt to obtain whisker pulses whose duration is long enough to assure the reversal of the following FF, delay circuits B1 to B5 are provided. No delay circuits are necessary if each FF has a sufficient delay effect. In some instances, however, it may be necessary to provide a delay circuit to each FF in addition to the delay circuits B1 to B5. As is understood from FIG. 7, the parallel adder circuit 20 performs an adding function at the rise and fall of the clock pulse each, thus terminating a whole summation, as for instance, follows: the output signal levels of the FFs 204, 205 and 206 are set at the rise of the second clock pulse for carrying out the second addition.

As is understood from the above, the parallel adder circuit 20 although using no full adder, can produce carry signals in performing summations of parallel numeric data synchronously with the clock signal, and the parallel adder circuit 20 can produce a train of pulses which has an improved regularity in pulse-to-pulse intervals.

FIG. 8 shows waveforms of ouput signals appearing at the terminal OUT 3 of the frequency-selectable signal generating of FIG. 6. For a parallel datum representing a decimal number "5", for example, the repetitive pattern of the output signal is composed of "13-13-12.5-13-12.5" counted in terms of the number of clock pulses, and for a parallel datum representing a decimal number "7", the repetitive pattern is composed of "9.5-9-9-9.5-9-9-9". The regularities in pulse-to-pulse intervals are still closer to the perfect regularity than those appearing in the parallel adder circuit of FIG. 4. This improvement in regularity pulse-to-pulse intervals is attributable above mentioned to the unique function in the parallel adding circuit 20 of FIG. 6. The use of the frequency-selectable signal generator makes it possible to provide a circuit for producing musical sounds with accuracy and easiness.

FIG. 9 shows a musical sound producing apparatus using a frequency-selectable signal generator according to this invention. It comprises a parallel adding circuit 30 responsive to clock signals for performing summation of parallel numeric data synchronous with the clock signals, a frequency divider 31 for dividing the frequency of the carry signal appearing at the output terminal of the parallel adding circuit 30, an amplifier circuit 32 for amplifying the output signal from the frequency divider 31, an electro-to-audio converter 33 driven by the amplifier circuit 32, a reference signal generator 34 for generating and supplying clock signals to the parallel adding circuit 30, and a frequency instructing apparatus 35 or 36 for supplying parallel numeric data to the parallel adding circuit 30. The frequency instructing apparatus may be a keyboard or melody storing apparatus capable of supplying binary-coded parallel numeric data, each corresponding to a musical note among 12 divisions of a given one octave.

Assume that the reference signal generator 34 produces clock signals at a frequency of 32,768 Hz, the parallel adding circuit 30 is designed to sum 9-bit parallel datum and a 6-bit frequency divider 31 is used. Then, sounds ranging from 0 to 511 Hz can be produced one frequency apart from each other. Thus, when the frequency instructing apparatus 35 or 36 supplies frequency data representing musical notes according to a musical score, a melody can be made. More specifically, frequency-to-musical note are determined, as for instance, 262 Hz for "do", 294 Hz for "re", 330 Hz for "mi" and so on; binary-coded parallel data are determined for different musical notes; binary-coded parallel numeric data are arranged in sequence according to a musical score; and then the so-arranged parallel numeric data are supplied to a frequency-selectable signal generator one after another to play a musical melody. The signals appearing at different FFs in the frequency divider are one octave apart from each other. If these signals are properly selected and supplied to the amplifier circuit 32, a melody covering a relatively wide range of musical scales can be made.

A frequency-selectable signal generator according to this invention is compared with a conventional "division-of-frequency-by 'n'" system in terms of musical notes and errors in the following table.

| Equally Tempered Scale | Prior Art $\frac{32768}{n}$ | | This Invention $32768 \times \frac{n}{2^l}$ | |
|---|---|---|---|---|
| Musical Notes | fs (Hz) | fA (Hz) | Error | fB (Hz) | Error |
| F  | 2793.8 | 2730.7 | −2.26% | 2792.0 | −0.07% |
| E  | 2637.0 | 2730.7 | +3.55% | 2640.0 | +0.11% |
| D# | 2489.0 | 2520.6 | +1.27% | 2488.0 | −0.04% |
| D  | 2349.3 | 2340.6 | −0.37% | 2352.0 | +0.11% |
| C# | 2217.5 | 2184.5 | −1.48% | 2216.0 | −0.07% |
| C  | 2093.0 | 2048.0 | −2.15% | 2096.0 | +0.14% |
| B  | 1975.5 | 1927.5 | −2.43% | 1976.0 | +0.02% |
| A# | 1864.7 | 1820.4 | −2.37% | 1864.0 | −0.04% |
| A  | 1760.0 | 1724.6 | −2.01% | 1760.0 | 0.00% |
| G# | 1661.2 | 1638.4 | −1.37% | 1660.0 | −0.07% |
| G  | 1568.0 | 1560.4 | −0.48% | 1568.0 | 0.00% |
| F# | 1480.0 | 1489.5 | +0.64% | 1480.0 | 0.00% |

In the table, "fs" stands for a standard frequency for a give musical scale; "$f_A$" and "$f_B$" stand for the frequencies obtained by prior art and by this invention respectively. Those sounds at frequencies above 1500 Hz were produced with a small-sized speaker, which was designed to fit in an electronic watch. The musical scale was an equally tempered scale containing note "A" at 1760 Hz. With a view of increasing resolution over that which is provided in FIGS. 4 or 6, 9-bit parallel datum were used, and the note signals were derived from appropriate stages of FFs in the frequency divider.

As is apparent from the table, the errors contained in the scale frequencies provided by the frequency-selectable signal generator according to this invention are reduced to one thirtyth of the errors in the prior art. A conventional signal generator could not distinguishably produce notes "E" and "F" without recourse to doubling the frequency of the clock signal with the aid of a multiplying circuit. The sound produced according to the principle of "division-of-frequency-by 'n'" contains a relatively small error in a relatively low frequency (and accordingly for a relatively large "n"), but a relative high frequency sound contains so large an error that the signal generator cannot be used for playing a musical melody.

A frequency-selectable signal generator according to this invention can be applied to generation of a given reference time in a stopwatch.

Naturally, the principle of the inventive idea remaining unchanged, the details of achievement and forms of realization thereof may be varied with respect of those described above by way of example and not limitation, without leaving the limits of the invention.

What I claim is:

1. A frequency-selectable signal generator comprising:
    reference signal generator means for generating clock signals;
    frequency instructing means for supplying parallel numeric datum pertaining to a given frequency to be generated; and
    accumulator means having first input terminal means for receiving said parallel numeric datum and second input terminal means for receiving the clock signals from said reference signal generator means, which are used to enable the accumulator means to accumulate said parallel numeric datum, said accumulator means including a binary counter composed of a series alternation of flip-flops and exclusive OR gates, and a drive circuit connected to said exclusive OR gates via bus conductors, thus enabling said drive circuit to drive said binary counter via said bus conductors synchronously with said clock signals,
    whereby when said parallel numeric datum is supplied to said first input terminal means of said accumulator means and when said clock signals are supplied to said second input terminal means of said accumulator means, said accumulator means performing addition of the number represented by said parallel numeric datum for every one clock pulse, thus outputting an overflow signal whose frequency is proportional to the number represented by said parallel numeric datum.

2. A frequency-selectable signal generator according to claim 1 wherein it further comprises a frequency divider for dividing the frequency of the overflow signal from said accumulator means.

3. A frequency-selectable signal generator according to claim 1 wherein said accumulator means is of the type in which the accumulation result is stored as an augend on which the next addition is performed; a series of additions are repeated synchronous by with said clock signals; and when the overflow signal appears, the remainder is stored as an augend on which the subsequent addition is performed.

4. A musical note generating apparatus comprising:
    reference signal generator means for generating clock signals;
    musical note instructing means for supplying parallel numeric data pertaining to different frequencies corresponding to musical notes;
    accumulator means responsive to each clock pulse from said referene signal generator for adding the number represented by said parallel numeric datum to the previous accumulation result and for outputting an overflow signal as a musical note signal, said accumulator means including a binary counter composed of a series alternation of flip-flops and exclusive OR gates, and a drive circuit connected to said exclusive OR gates via bus conductors, thus enabling said drive circuit to drive said binary counter via said bus conductors synchronously with said clock signals;
    a frequency divider for dividing the frequency of the overflow signal; and
    an electro-to-audio converter for converting the frequency-divided musical note signal to an audio output signal.

* * * * *